E. C. DUNLAP.
STEERING DEVICE FOR TRACTORS.
APPLICATION FILED JUNE 10, 1921.
1,426,556.
Patented Aug. 22, 1922.
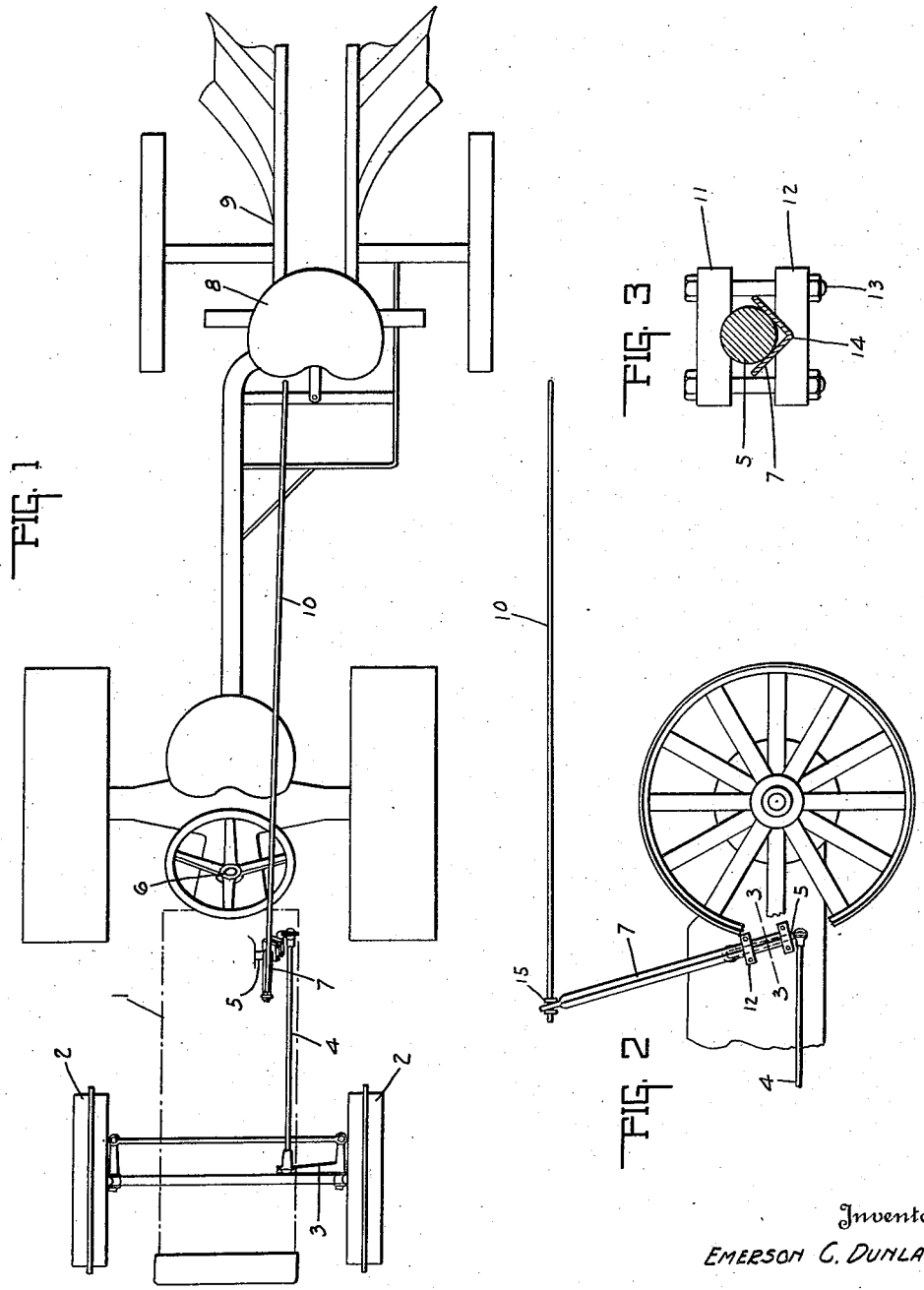
Inventor
EMERSON C. DUNLAP.
By
Attorney

UNITED STATES PATENT OFFICE.

EMERSON C. DUNLAP, OF MIAMI, INDIANA.

STEERING DEVICE FOR TRACTORS.

1,426,556.        Specification of Letters Patent.        Patented Aug. 22, 1922.

Application filed June 10, 1921. Serial No. 476,550.

*To all whom it may concern:*

Be it known that I, EMERSON C. DUNLAP, a citizen of the United States, residing at Miami, in the county of Miami and State of Indiana, have invented certain new and useful Improvements in Steering Devices for Tractors, of which the following is a specification.

This invention relates to steering devices for tractors, and the prime feature of the invention is the provision of means whereby the steering mechanism of the tractor may be operated from a point removed from the tractor so that when the tractor is being used in connection with farm machinery, or other implements requiring an attendant with the implement, it will not require two attendants, one for operating and guiding the tractor, and the other for operating the implement.

A further feature of the invention is the provision of means for securely and quickly attaching the operating mechanism to the parts of the guiding mechanism for the tractor.

Other objects and advantages will be hereinafter more fully set forth and pointed out in the accompanying specification.

In the accompanying drawings,

Figure 1 is a top plan view of the tractor with a braking plow attached thereto showing the guiding mechanism in operative position, Figure 2 is a side elevation of the rear portion of the tractor showing the guiding mechanism applied to use, and Figure 3 is an enlarged sectional view as seen on line 3—3, Figure 2.

Referring to the drawings, 1 indicates a tractor of the Fordson type, the front wheels 2 of which are used for guiding the tractor, the conventional form of steering arms 3 being provided, to one of which is attached the usual form of drag link 4, the rear end of the drag link being connected with a crank arm 5 which is operated by a steering shaft 6, all of these parts being of the usual type for Fordson tractors.

It frequently happens that an implement is drawn by the tractor which requires an attendant on the implement, and to obviate the necessity of requiring an additional attendant for operating the tractor, an elongated extension 7 is attached to the crank arm 5 so that said crank arm may be swung back and forth for giving an end thrust to the drag link for guiding the front wheels 2 through the steering arms 3, and to enable the operator, while occupying the seat 8 on the implement 9, to control the guiding mechanism of the tractor, a rod 10 is extended from the upper end of the extension 7 to a point in convenient reach of the occupant of the seat 8, consequently the tractor may be as readily guided by the operator upon the implement as when occupying a position upon the tractor. As the crank arm 5 is preferably circular in cross section, the extension 7 is preferably constructed of a section of angle iron and attached to the crank arm by means of clamps 11 and 12 and bolts 13, the clamp preferably having a V-shape notch 14 for engagement with the apex of the extension 7.

There are preferably two sets of the clamps 11 and 12, one adjacent the lower and the other adjacent the upper end of the crank arm 5, consequently the extension 7 is held in rigid connection with the crank arm. The upper end of the extension 7 is preferably flattened and the flattened portion provided with an opening through which the end of the rod 10 passes, nuts, or the like, 15 being threaded onto the rod 10 and on opposite sides of the flattened portion of the extension, thereby more or less flexibly connecting the rod with the extension.

Any suitable extensions may be provided for controlling the usual form of clutch and throttle of the tractor from a position on the implement, but as these features form no part of the present invention, it is not deemed necessary to show and describe the same.

In operation, the attendant occupying the seat of the implement swings the upper end of the extension 7 forwardly or rearwardly through the medium of the rod 10 for properly guiding the tractor without leaving the seat on the implement, and when the end of the field has been reached the extension rod may be quickly operated for positioning the guiding wheels for turning the tractor.

This device can be very cheaply manufactured in view of its simplicity, and can be very quickly and easily attached to the guiding mechanism of the tractor, and by extending the rod a distance in the rear of the tractor the necessity of an extra attendant for guiding the tractor may be dispensed with as the occupant of the implement being drawn by the tractor may readily control and guide the tractor while positioned upon the implement.

Having thus fully described my said invention, what I claim as new and desire to secure by Letters Patent, is:

1. The combination with a steering mechanism of a tractor including a steering crank arm, of an angular shaped extension extending parallel with and a distance above said crank arm, said crank arm entering the hollow between the angular sections of the extension, clamping members for securing the extension to the crank arm, one of said members having a V-shaped notch for engagement with the apex of said extension, and a rod connected with the upper end of said extension and projecting a distance in the rear of the tractor whereby said crank arm may be operated for controlling the guiding mechanism for the tractor from a point distant from the tractor.

2. The combination with the steering crank arm of a tractor, of an extension angular in cross section, said steering arm entering the hollow between the angular faces of the extension for holding the extension in rigid alignment with the crank arm, the angular portions at the upper end of the extension being flattened together and provided with an opening, clamping members for securing the extension to the crank arm, and an operating rod having one of its ends secured in said opening through the flattened end of said extension and its opposite end extended a distance therefrom.

In witness whereof, I have hereunto set my hand and seal this 2nd day of June, A. D., nineteen hundred and twenty-one.

EMERSON C. DUNLAP. [L. S.]

Witnesses:
D. W. O. Brien,
Edw. A. Sirisdorfer.